(12) United States Patent
Berry

(10) Patent No.: US 11,181,043 B2
(45) Date of Patent: Nov. 23, 2021

(54) APPARATUSES AND METHODS FOR GENERATING CARBON PARTICLES AND EXHAUST GAS USED BY GAS TURBINE SYSTEMS

(71) Applicant: General Electric Company, Schenectady, NY (US)

(72) Inventor: Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 16/587,320

(22) Filed: Sep. 30, 2019

(65) Prior Publication Data

US 2021/0095594 A1 Apr. 1, 2021

(51) Int. Cl.
| | |
|---|---|
| *F02C 3/20* | (2006.01) |
| *C01B 32/05* | (2017.01) |
| *F02C 3/34* | (2006.01) |
| *F02C 6/00* | (2006.01) |

(52) U.S. Cl.
CPC ............... *F02C 3/20* (2013.01); *C01B 32/05* (2017.08); *F02C 3/34* (2013.01); *F02C 6/00* (2013.01)

(58) Field of Classification Search
CPC ...... F02C 3/20; F02C 3/28; F02C 3/30; F02C 3/34; F02C 6/00; C01B 32/05
See application file for complete search history.

(56) References Cited

U.S. PATENT DOCUMENTS

| | | | |
|---|---|---|---|
| 7,395,670 B1 * | 7/2008 | Drnevich | F02C 9/26 60/780 |
| 8,398,894 B2 | 3/2013 | Choi et al. | |
| 9,890,045 B2 | 2/2018 | Raman et al. | |
| 2007/0006592 A1 * | 1/2007 | Balan | F02C 3/34 60/772 |
| 2009/0140215 A1 | 6/2009 | Buchholz et al. | |
| 2014/0053529 A1 * | 2/2014 | Allam | F25J 3/04618 60/39.182 |

* cited by examiner

*Primary Examiner* — Steven M Sutherland
(74) *Attorney, Agent, or Firm* — James Pemrick; Hoffman Warnick LLC

(57) ABSTRACT

Apparatuses for generating carbon particles and exhaust gas used by gas turbine systems are disclosed. One apparatus may include a decarbonization component combusting or reacting a mixture of a fuel and a mixing gas to generate the carbon particles and the exhaust gas and an exhaust conduit to receive the exhaust gas generated by the decarbonization component. The apparatus may also include a mixing duct in fluid communication with the exhaust conduit and the gas turbine system. The mixing duct may receive the exhaust gas and provide the exhaust gas to the gas turbine system to be used to produce a working fluid within the gas turbine system. The apparatus may further include a carbon particle collection component for receiving and storing the generated carbon particles.

18 Claims, 9 Drawing Sheets

APPARATUSES AND METHODS FOR GENERATING CARBON PARTICLES AND EXHAUST GAS USED BY GAS TURBINE SYSTEMS

STATEMENT REGARDING GOVERNMENT FUNDING

This application was made with government support under contract number DE-FE0023965 awarded by the Department of Energy. The US government has certain rights in the invention.

TECHNICAL FIELD

The disclosure relates generally to apparatuses and methods for generating carbon particles and exhaust gas, and, more particularly, to apparatuses for generating carbon particles and for directing the exhaust gas from carbon particle generation for use by gas turbine systems in communication with the apparatuses.

BACKGROUND

Conventional processes for generating carbon material typically include injecting combustible fuel(s) to mix with gases of a combustion device. For example, FIGS. 1A and 1B show various views of a conventional diffusion flame system 1 that is configured to generate carbon material. In the conventional system 1 shown in FIGS. 1A and 1B, a diffusion flame combustion component 2 may receive fuel from a fuel source 3 (FIG. 1A), and may subsequently combust the fuel using an ignition device 4 (FIG. 1B). Simultaneous to combustion and/or ignition of the fuel, a gas may be provided to diffusion flame combustion component 2 via a gas source 5. Combusting the fuel and introducing the gas within diffusion flame combustion component 2 results in the generation of carbon material ("carbon") within diffusion flame combustion component 2. As shown in FIG. 1B, additional fuel may be introduced into the diffusion flame combustion component 2 via at least one nozzle 6, downstream of the ignition device 4 and/or the mixture of the combusted fuel and gas, to generate additional carbon material.

Once formed, carbon material may be extracted from and/or gathered within diffusion flame combustion component 2 using a filtering device 7. Filtering device 7 may be configured to separate the carbon material from the combusted gas (including the combusted fuel, gas, and added fuel via nozzles 6) flowing through diffusion flame combustion component 2, prior to the combusted gas being exhausted from the diffusion flame combustion component 2. Combusted gas, with carbon material removed and/or filtered out, may be exhausted from diffusion flame combustion component 2 via an exhaust line 8. In conventional system 1, exhaust line 8 of diffusion flame combustion component 2 may expel and/or release combusted gas into the surrounding environment or atmosphere without further processing and/or use. As shown in FIG. 1B, diffusion flame combustion component 2 may include a quenching component 9 that may spray a liquid (e.g., water) within diffusion flame combustion component 2 to aid in the filtration of the carbon material from the combusted gas, as performed by the filtering device 7. In addition to aiding in the filtration and/or separation of carbon material from the combusted gas, quenching component 9 may also reduce the temperature of combusted gas prior to the combusted gas exiting diffusion flame combustion component 2 via exhaust line 8.

BRIEF DESCRIPTION

A first aspect of the disclosure provides an apparatus for generating carbon particles and an exhaust gas used by a gas turbine system. The apparatus includes: a decarbonization component combusting a mixture of a fuel and a mixing gas to generate the carbon particles and the exhaust gas; an exhaust conduit in fluid communication with the decarbonization component, the exhaust conduit receiving the exhaust gas generated by the decarbonization component; and a mixing duct in fluid communication with the exhaust conduit and the gas turbine system, the mixing duct receiving the exhaust gas and providing the exhaust gas to the gas turbine system to be used to produce a working fluid within the gas turbine system.

A second aspect of the disclosure provides a method including: combusting or reacting a mixture of a fuel and a mixing gas using a decarbonization component to generate carbon particles and an exhaust gas; collecting the generated carbon particles; delivering the exhaust gas from the decarbonization component to a mixing duct in fluid communication with the decarbonization component; and supplying the exhaust gas to a gas turbine system in fluid communication with the mixing duct.

A third aspect of the disclosure provides a system including: a gas turbine system including: a rotor, a compressor coupled to the rotor, the compressor generating compressed air, a combustor in fluid communication with the compressor, the combustor generating combustion gas flow using the compressed air, and a turbine component in fluid communication with the combustor for receiving the combustion gas flow, and an apparatus for generating carbon particles and an exhaust gas used by the gas turbine system, the apparatus in fluid communication with the gas turbine system and including: a catalytic partial oxidation (CPOX) component combusting a mixture of a fuel and a mixing gas to generate the carbon particles and the exhaust gas, an exhaust conduit in fluid communication with the CPOX component, the exhaust conduit receiving the exhaust gas generated by the CPOX component, and a mixing duct in fluid communication with the exhaust conduit and the gas turbine system, the mixing duct receiving the exhaust gas and providing the exhaust gas to the gas turbine system to be used to produce a working fluid within the turbine component.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively.

As indicated above, the disclosure relates generally to apparatuses and methods for generating carbon particles and exhaust gas, and, more particularly, to apparatuses for generating carbon particles and for directing the exhaust gas from carbon particle generation for use by gas turbine systems in communication with the apparatuses.

These and other embodiments are discussed below with reference to FIGS. 2-10. However, those skilled in the art will readily appreciate that the detailed description given herein with respect to these Figures is for explanatory purposes only and should not be construed as limiting.

Figure 2:
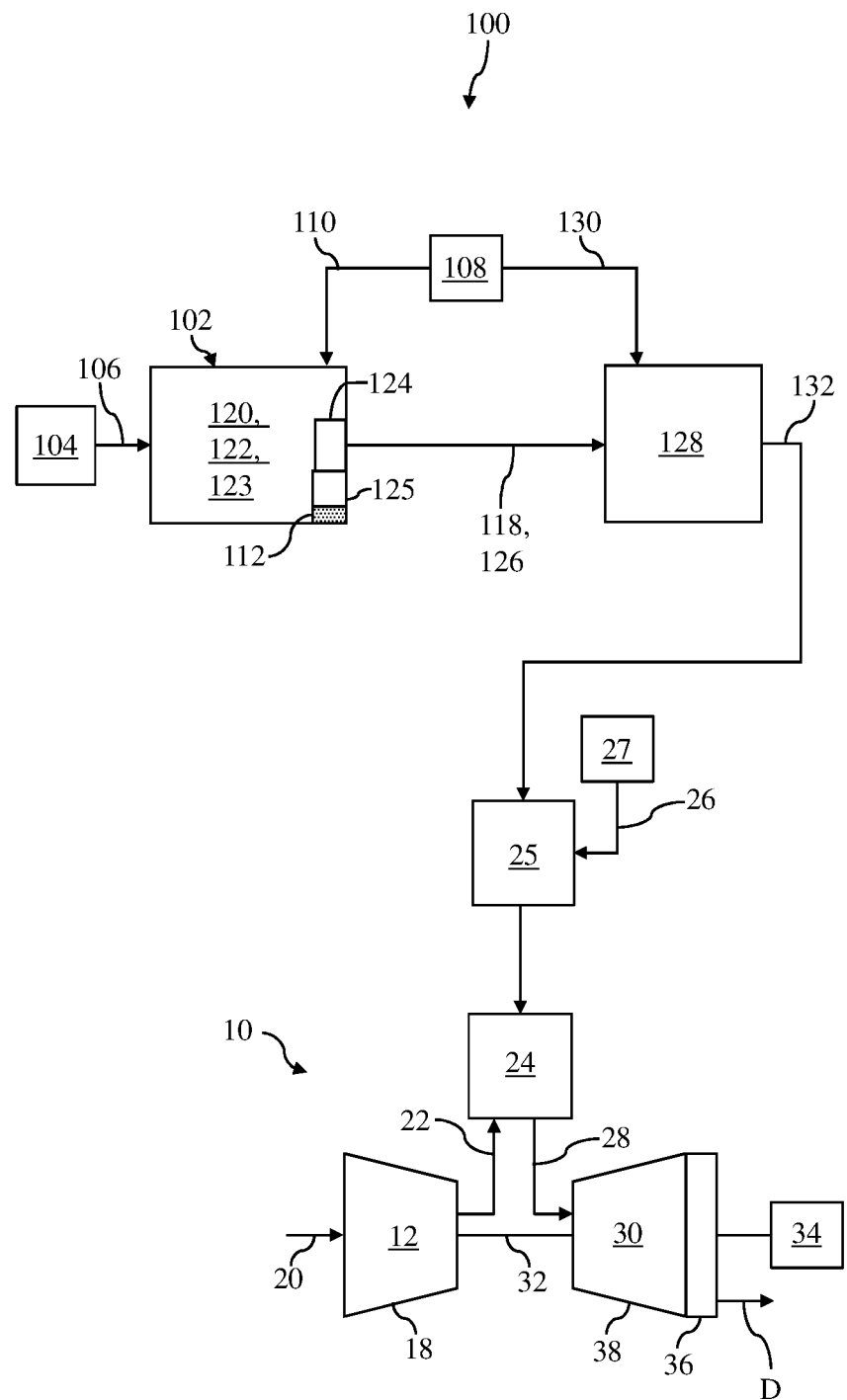
FIG. 2 shows a schematic diagram of a gas turbine system and an apparatus for generating carbon particles and exhaust gas, according to embodiments of the disclosure.

FIG. 2 shows a schematic view of an illustrative gas turbine system 10. Gas turbine system 10 may include a compressor 12 and an enclosure, shell, or casing 18 of compressor 12. Compressor 12 compresses an incoming flow of air 20 flowing into compressor 12. Specifically, compressor 12 typically includes a plurality of blades including airfoils (not shown) and nozzles (not shown) which work together to compress air 20 as it flows through compressor 12. Compressor 12 delivers a flow of compressed air 22 to a combustor 24.

Combustor 24 mixes the flow of compressed air 22 with a pressurized flow of fuel 26, provided by fuel supply 27, via a premixer 25, and ignites the mixture to create a flow of combustion gas 28. Additionally, and as discussed herein, premixer 25 may also mix an exhaust gas 118 or an exhaust gas mixture 132 produced by an apparatus 100 with fuel 26 supplied by fuel supply 27 prior to flowing the mixture or combination of fuel 26 and exhaust gas 118/exhaust gas mixture 132 to combustor 24 to create combustion gas flow 28. Although only a single premixer 25 and a single combustor 24 are shown, gas turbine system 10 may include any number of premixers 25 and combustors 24 (including configurations in which multiple premixers 25 are used for each combustor 24).

The combustion gas flow 28 (e.g., including a mixture of exhaust gas 118 or exhaust gas mixture 132 from apparatus 100 and fuel 26 from fuel supply 27) is, in turn, delivered to a turbine 30. Similar to compressor 12, turbine 30 also typically includes a plurality of turbine blades including rotating airfoils and stator vanes. Combustion gas flow 28 drives turbine 30, and more specifically the plurality of turbine blades of turbine 30, to produce mechanical work. The mechanical work produced in turbine 30 drives compressor 12 via a rotor 32 extending through turbine 30, and may be used to drive an external load 34, such as an electrical generator and/or the like for electrical power generation.

Gas turbine system 10 may also include an exhaust frame 36. As shown in FIG. 2, exhaust frame 36 may be positioned adjacent to turbine 30 of gas turbine system 10. More specifically, exhaust frame 36 may be positioned adjacent to turbine 30 and may be positioned substantially downstream of turbine 30 and/or combustion gas flow 28 flowing from combustor 24 to turbine 30. As discussed herein, a portion (e.g., outer casing) of exhaust frame 36 may be coupled directly to an enclosure, shell, or casing 38 of turbine 30.

Subsequent to combustion gas flow 28 moving through and driving turbine 30, combustion gas flow 28 may flow through and/or may be discharged through exhaust frame 36 in a flow direction (D). In the non-limiting example shown in FIG. 2, combustion gas flow 28 may flow through exhaust frame 36 in the flow direction (D) and may be discharged from gas turbine system 10 (e.g., to the atmosphere). In another non-limiting example where gas turbine system 10 is part of a combined cycle power plant (e.g., including gas turbine system 10 and a steam turbine system), combustion gas flow 28 may be discharged from exhaust frame 36, and may flow in the flow direction (D) into a heat recovery steam generator of the combined cycle power plant.

FIG. 2 also shows a non-limiting example of an apparatus 100 that may be configured to generate carbon particles simultaneously with exhaust gas that may be used to produce a working fluid used by gas turbine system 10. Apparatus 100 may include a plurality of devices, components, and/or features that may aid in the generation of carbon particles and/or exhaust gas, as discussed herein. The generated carbon particles may be collected and used in the manufacturing and/or creation of various components and devices in a wide range of industries. Additionally, the exhaust gas generated by apparatus 100 may be provided to gas turbine system 10 to be utilized as a working fluid (e.g., air 20, compressed air 22, combustion gas flow 28).

In the non-limiting example, apparatus 100 may include a decarbonization component 102. Decarbonization component 102 may be formed as any suitable combustion component, system, and/or device that may receive, combust, and/or react various inputs or materials (e.g., fuel, mixing fluid) to generate carbon particles and exhaust gas, as discussed herein. Decarbonization component 102 may be in fluid communication with and/or fluidly coupled to a fuel supply 104 that may supply a fuel 106 to decarbonization component 102. Fuel 106 included in and/or supplied by fuel supply 104 may include, but is not limited to, natural gas, oil, fossil fuels, and the like. The type of fuel 106 included in fuel supply 104 may be dependent, at least in part, on the configuration of decarbonization component 102, as discussed herein. In the non-limiting example, fuel supply 104 may be distinct from fuel supply 27 that provides fuel 26 to combustor 24 of gas turbine system 10. In another non-limiting example, fuel supply 104 may provide fuel 106 to decarbonization component 102, as well as fuel 26 to combustor 24 of gas turbine system 10.

Decarbonization component 102 may also be in fluid communication with, and/or may be fluidly coupled to, a mixing gas supply 108. Mixing gas supply 108 may be configured to supply a mixing gas 110 to decarbonization component 102 during operation of apparatus 100. Mixing gas 110 supplied by mixing gas supply 108 may include, but is not limited to, ambient air, oxygen, hydrogen, and/or any other suitable gas that may aid in the combustion of fuel 106 and/or aid in the combustion process performed by decarbonization component 102. Similar to the type of fuel 106 included in fuel supply 104, the composition of mixing gas 110 included in mixing gas supply 108 may be dependent, at least in part, on the configuration of decarbonization component 102, as discussed herein. Additionally, mixing gas 110 may be used to cool down the exhaust gas 118, to adjust the composition of the exhaust gas 118, or to otherwise facilitate operation of apparatus 100 and/or gas turbine system 10.

In the non-limiting example, mixing gas supply 108 may be distinct from gas turbine system 10, and may not provide any mixing gas 110 to gas turbine system 10 during operation. In another non-limiting example, mixing gas supply 108 may provide mixing gas 110 to decarbonization component 102, as well as premixer 25 of compressor 12 of gas turbine system 10.

Decarbonization component 102 in fluid communication with fuel supply 104 and mixing gas supply 108, respectively, may be any device configured to combust and/or react the mixture of fuel 106 and mixing gas 110 to generate carbon particles 112 and exhaust gas 118. That is, decarbonization component 102 may receive both fuel 106 and mixing gas 110, mix the two fluids, and subsequently ignite or react the mixture of fuel 106 and mixing gas 110 to generate, create, and/or form carbon particles 112 and exhaust gas 118. In a non-limiting example, decarbonization component 102 may include and/or may be formed as a diffusion flame combustion component 120 that may combust fuel 106 and mixing gas 110 to form carbon particles 112 and exhaust gas 118. In another non-limiting example, decarbonization component 102 may include and/or may be formed as a catalytic partial oxidation (CPOX) component 122 that may perform a catalytic partial oxidation reaction and/or process to generate carbon particles 112 and exhaust gas 118. In a further non-limiting example, decarbonization component 102 may include and/or may be formed as an auto-thermal reformer component 123 that may perform a thermal reformation reaction and/or process to generate carbon particles 112 and exhaust gas 118. Each of the non-limiting examples of decarbonization component 102 and the specific functionality of each is discussed in greater detail herein with respect to FIGS. 7-9.

Carbon particles 112 generated by decarbonization component 102 may be collected, stored, and/or gathered after being generated. That is, carbon particles 112 may be separated from exhaust gas 118, both generated by decarbonization component 102, and may be collected for additional processing and/or use. In the non-limiting example shown in FIG. 2, decarbonization component 102 may include a particle separation unit 124 included therein and/or formed integral therewith. In other non-limiting examples discussed herein (see, FIGS. 3-6), particle separation unit 124 may be a distinct or separate unit and/or component from decarbonization component 102 within apparatus 100. Particle separation unit 124 included within decarbonization component 102 may receive carbon particles 112 and exhaust gas 118 generated by decarbonization component 102 and may subsequently separate the carbon particles 112 from exhaust gas 118. As discussed herein, carbon particles 112 and exhaust gas 118, separated using particle separation unit 124 may each be stored and/or processed for further use within apparatus 100. Particle separation unit 124 may be formed as any suitable unit, device, and/or component that may be configured to extract, remove, and/or separate generated carbon particles 112 from exhaust gas 118 formed by combusting and/or reacting fuel 106 and mixing gas 110, as discussed herein. In non-limiting examples, particle separation unit 124 may be formed as a filter or filtration system, particle-collection bags, a particle agitator, a cyclone separator system, and the like.

Once separated from exhaust gas 118, carbon particles 112 may be collected and/or gathered within a storage portion 125 of decarbonization component 102. That is, in the non-limiting example shown in FIG. 2, decarbonization component 102 may include storage portion 125 that may be in communication with particle separation unit 124 to collect and/or gather carbon particles 112 after fuel 106 and mixing gas 110 are combusted and/or reacted by decarbonization component 102. In other non-limiting examples (see, FIG. 3), carbon particles 112 separated from exhaust gas 118 using particle separation unit 124 may be provided to a separate collection component for collecting, storing and/or gathering generated carbon particles 112. As discussed herein, carbon particles 112 generated by decarbonization component 102 may include, any carbon-based particle that may be utilized for further processing, building, manufacturing, and/or the like.

Exhaust gas 118 generated by decarbonization component 102 during the combustion process may include a gas and/or fluid that may be partially or completely free of carbon particles and/or carbon material. In non-limiting examples, exhaust gas 118 may be formed as hydrogen gas, a mixture of hydrogen and nitrogen, or a mixture that is substantially comprised of hydrogen, nitrogen, and additional materials including, but not limited to, a reduced amount (e.g., less than 10%) of carbon or carbon particles 112.

Apparatus 100 may also include exhaust conduit 126. Exhaust conduit 126 may be in direct fluid communication with and/or may be fluidly coupled to decarbonization component 102 and, more specifically, particle separation unit 124 of decarbonization component 102. In the non-limiting example shown in FIG. 2, exhaust conduit 126 may be in fluid communication with and/or may fluidly couple decarbonization component 102 to a mixing duct 128 of apparatus 100. Exhaust conduit 126 may receive exhaust gas 118 directly from decarbonization component 102 after exhaust gas 118 is generated during the combustion and/or reaction process. Additionally, in the non-limiting example, mixing duct 128, which is fluidly coupled to exhaust conduit 126, may deliver exhaust gas 118 from the apparatus 100 to premixer 25 for use to produce a working fluid in gas turbine 10, as discussed herein.

Mixing duct 128 may be in fluid communication with, and/or may be fluidly coupled to, exhaust conduit 126. Additionally, mixing duct 128 may be in fluid communication with, and/or may be fluidly coupled to, mixing gas supply 108. Mixing duct 128 may have various configurations or components, including a configuration that includes an upstream flame arrestor, a mixing section, and a downstream flame arrestor. Mixing duct 128 promotes rapid mixing of exhaust gas 118 and auxiliary mixing gas 130, discussed herein, while preventing or reducing the likelihood of autoignition.

During operation, mixing gas supply 108 may supply and/or provide auxiliary mixing gas 130 to mixing duct 128, while exhaust conduit 126 provides exhaust gas 118 to mixing duct 128. Mixing duct 128 may receive exhaust gas 118 and auxiliary mixing gas 130, and may subsequently mix the two materials to form mixture 132. That is, mixing duct 128 may include any component, device, and/or system that may receive, mix, and/or create mixture 132 comprised of exhaust gas 118 generated by decarbonization component 102 and auxiliary mixing gas 130 supplied by mixing gas supply 108.

In addition to being fluidly coupled to exhaust conduit 126 and gas supply 108, mixing duct 128 may also be fluidly coupled to and/or in fluid communication with gas turbine system 10. More specifically, and as shown in FIG. 2, mixing duct 128 may be in fluid communication with premixer 25, which is in direct fluid communication with combustor 24 of gas turbine system 10. Mixing duct 128 may supply mixture 132 (e.g., exhaust gas 118, auxiliary mixing gas 130) to gas turbine 10 and, more specifically, to premixer 25, so mixture 132 may be used to produce a working fluid (e.g., combustion gas flow 28) within gas turbine system 10.

In the non-limiting example, mixture 132 and fuel 26 may be mixed with compressed air 22 previously compressed by compressor 12. That is, mixture 132 supplied by mixing duct 128 and fuel 26 supplied by fuel supply 27 may be provided to combustor 24 via premixer 25 and may be mixed with compressed air 22 within combustor 24. In the non-limiting example, mixture 132 and fuel 26 may be mixed or combined with compressed air 22 and may be subsequently ignited in combustor 24 to generate combustion gas flow 28. That is, combustion gas flow 28 in the non-limiting example may include and/or be formed from the combustion of compressed air 22, fuel 26, and mixture 132 (e.g., exhaust gas 118, auxiliary mixing gas 130). Combustion gas flow 28 may then be provided to and used by turbine 30 of gas turbine system 10, as discussed herein.

FIGS. 3-6 show schematic views of additional non-limiting examples of gas turbine system 10 and apparatus 100. Apparatus 100 shown in each of the non-limiting examples of FIGS. 2-6 may include distinct configurations and/or additional features discussed herein. It is understood that similarly numbered and/or named components may function in a substantially similar fashion. Redundant explanation of these components has been omitted for clarity.

Figure 3:
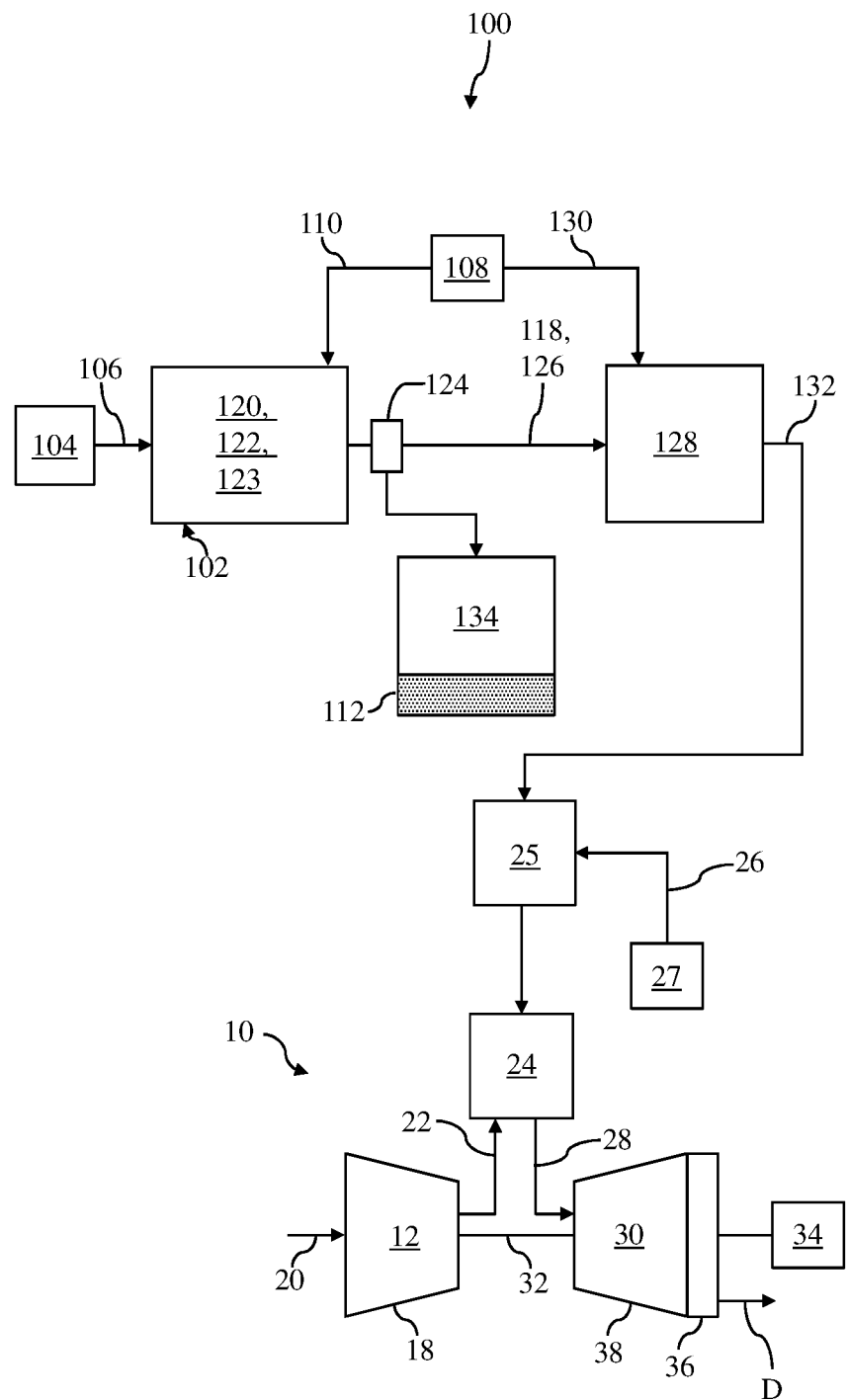
FIG. 3 shows a schematic diagram of a gas turbine system and an apparatus for generating carbon particles and exhaust gas, according to additional embodiments of the disclosure.

Distinct from the non-limiting example shown in FIG. 2, decarbonization component 102 shown in FIG. 3 may not include particle separation unit 124 formed therein and/or formed integral therewith. Instead, the non-limiting example of apparatus 100 shown in FIG. 3 may include particle separation unit 124 formed as a distinct component or device from decarbonization component 102. More specifically, particle separation unit 124 may be positioned downstream of and in communication with decarbonization component 102. As shown in the non-limiting example, particle separation unit 124 may be positioned on and/or in communication with exhaust conduit 126, between decarbonization component 102 and mixing duct 128. As similarly discussed herein with respect to FIG. 2, particle separation unit 124 may be configured as any suitable device, unit, and/or component that may receive and separate carbon particles 112 and exhaust gas 118. Once separated, particle separation unit 124 may deliver and/or provide each of carbon particles 112 and exhaust gas 118 to respective components and/or portions of apparatus 100. In the non-limiting example shown in FIG. 3, particle separation unit 124 may provide exhaust gas 118 directly to mixing duct 128 via exhaust conduit 126.

Additionally, as shown in FIG. 3, decarbonization component 102 of apparatus 100 may not include storage portion 125 (see, FIG. 2). Rather in the non-limiting shown in FIG. 3, apparatus 100 may include a carbon particle collection component 134. Carbon particle collection component 134 may be distinct from and in communication with particle separation unit 124. That is, carbon particle collection component 134 may be in communication with particle separation unit 124 in order to receive, collect, and/or store the carbon particles 112 generated by decarbonization component 102 during the combustion or reaction processes and subsequently separated from exhaust gas 118 using particle separation unit 124. Carbon particle collection component 134 may be formed from any suitable component, device, and/or system that may receive or pull carbon particles 112 from particle separation unit 124 and that is configured to store, collect, and/or receive, and subsequently preserve, carbon particles 112.

Figure 4:
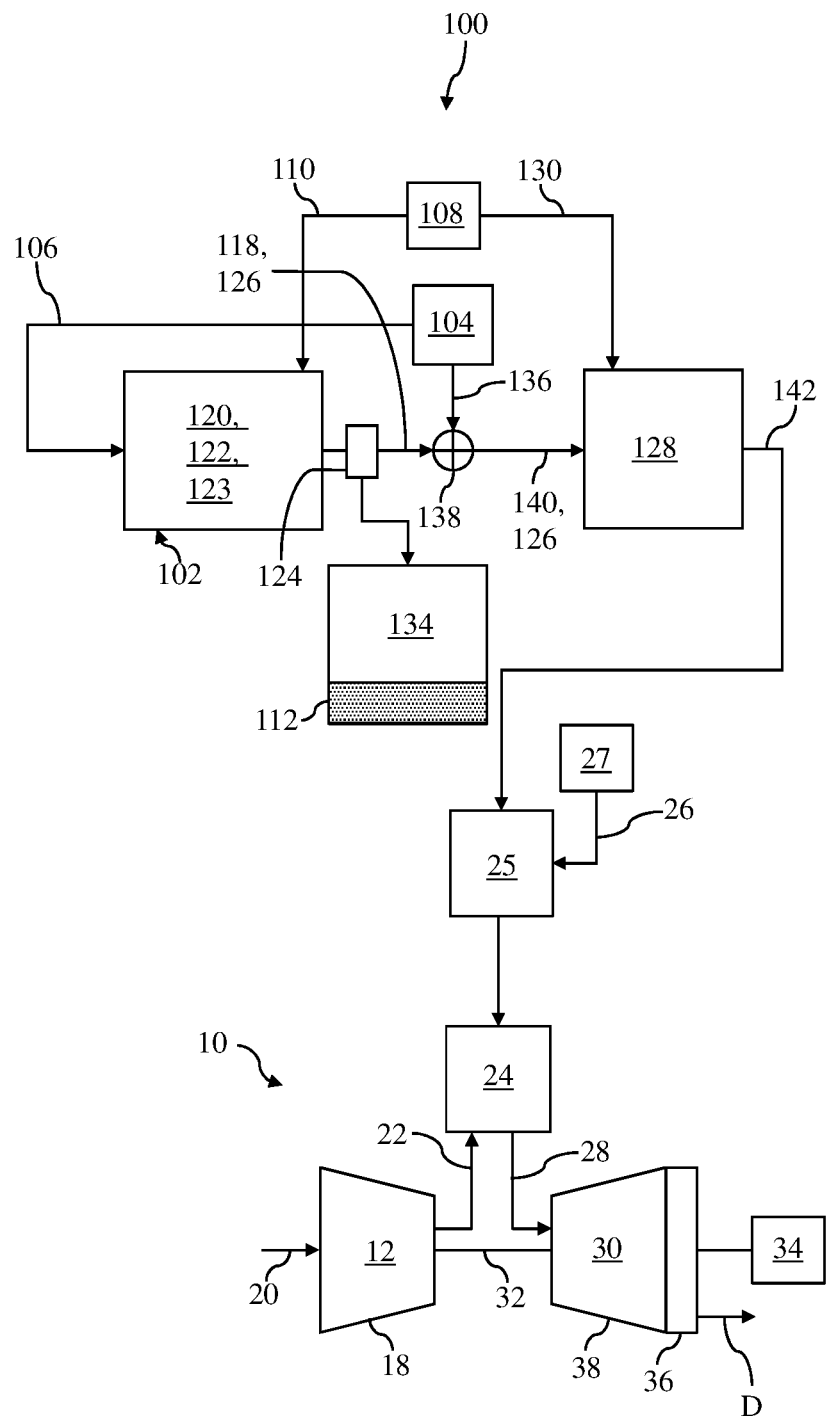
FIG. 4 shows a schematic diagram of a gas turbine system and an apparatus for generating carbon particles and exhaust gas, according to another embodiment of the disclosure.

In the non-limiting example shown in FIG. 4, fuel supply 104 may also provide auxiliary fuel 136 to exhaust gas 118. That is, fuel supply 104 providing fuel 106 to decarbonization component 102 may also provide auxiliary fuel 136 to exhaust gas 118 flowing through exhaust conduit 126. Fuel supply 104 may be in fluid communication with and/or fluidly coupled to exhaust conduit 126 via a fuel valve 138 positioned on, within, and/or in communication with exhaust conduit 126, downstream of particle separation unit 124. In the non-limiting example, auxiliary fuel 136 may be mixed with exhaust gas 118 in exhaust conduit 126 and/or fuel valve 138 to form a mixture 140. Mixture 140 may then flow through the remaining portion of exhaust conduit 126 positioned downstream of fuel valve 138 and be delivered and/or provided to mixing duct 128.

As similarly discussed herein with respect to exhaust gas 118 in FIG. 2, mixture 140, including exhaust gas 118 and auxiliary fuel 136, may be delivered to mixing duct 128, and may subsequently be mixed or combined with auxiliary mixing gas 130 supplied by mixing gas supply 108 in mixing duct 128. The mixing and/or combining of mixture 140 (e.g., exhaust gas 118, auxiliary fuel 136) and auxiliary mixing gas 130 in mixing duct 128 may result in the formation of a second mixture 142. Mixing duct 128 may then supply and/or deliver second mixture 142 (e.g., mixture 140, auxiliary mixing gas 130) to premixer 25 in communication with combustor 24 to be used to produce a working fluid (e.g., combustion gas flow 28) within gas turbine system 10. More specifically, and as similarly discussed herein, second mixture 142 may be combined with fuel 26 in premixer 25, and subsequently combined with compressed air 22 and ignited in combustor 24 to generate combustion gas flow 28.

Adding auxiliary fuel 136 to exhaust gas 118, as shown in FIG. 4, results in second mixture 142 supplied to premixer 25 of gas turbine system 10 including unignited fuel (e.g., auxiliary fuel 136). As a result, an amount of fuel 26 supplied to premixer 25 and required by combustor 24 to form combustion gas flow 28 may be reduced or eliminated. This in turn may improve the operational efficiency of apparatus 100 and may facilitate load adjustments (i.e., "turn-down") of gas turbine system 10. Fuel 26 may be the primary fuel used by combustor 24 or a back-up fuel to the primary fuel used by combustor 24. Further, fuel 26 may have the same fuel composition as fuel 136, or fuel 26 may have a different fuel composition from fuel 136.

Figure 5:
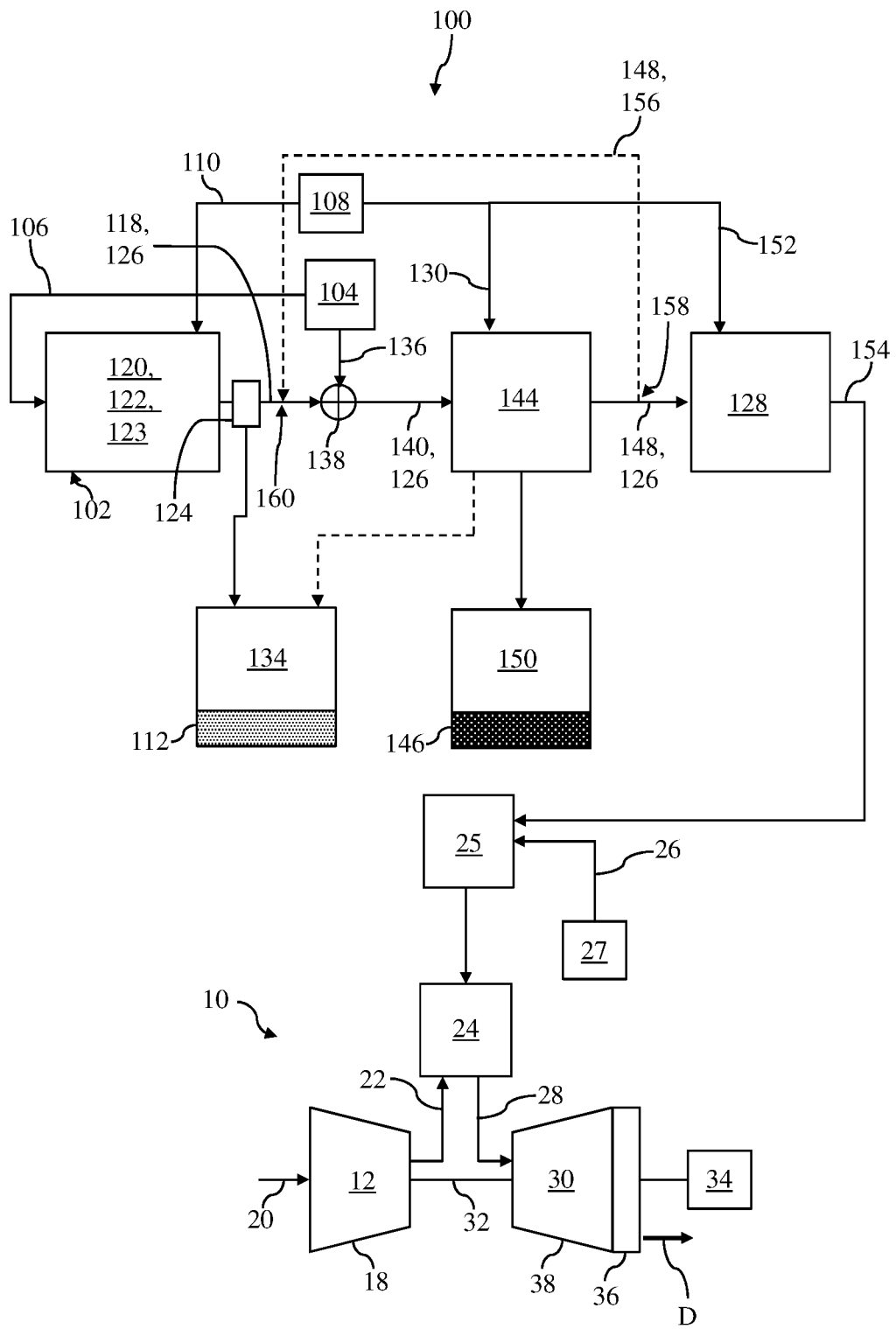
FIG. 5 shows a schematic diagram of a gas turbine system and an apparatus for generating carbon particles and exhaust gas, according to further embodiments of the disclosure.

In the non-limiting example shown in FIG. 5, apparatus 100 may also include an auxiliary decarbonization component 144. Auxiliary decarbonization component 144 may be in fluid communication with and/or fluidly coupled to exhaust conduit 126 (to receive exhaust gas 118), mixing gas supply 108 (to receive auxiliary mixing gas 130), and mixing duct 128 (to deliver exhaust gas 148). Additionally, and as shown in FIG. 5, auxiliary decarbonization component 144 may be positioned downstream of fuel valve 138 and particle separation unit 124 and upstream of mixing duct 128 of apparatus 100. Auxiliary decarbonization component 144 may be substantially similar in structure and/or function to decarbonization component 102 of apparatus 100. That is, auxiliary decarbonization component 144 may be any device configured to combust or react mixture 140, including exhaust gas 118 and auxiliary fuel 136, as well as (optional) auxiliary mixing gas 130, to generate, create, and/or form additional carbon particles 146 and remaining exhaust gas 148. In non-limiting examples, and similar to decarbonization component 102, auxiliary decarbonization component 144 may include and/or be formed as diffusion flame combustion component 120, CPOX component 122, or auto-thermal reformer component 123 to generate additional carbon particles 146 and remaining exhaust gas 148.

Similar to carbon particles 112 generated by decarbonization component 102, additional carbon particles 146 may include, but are not limited to, any carbon-based particles that may be utilized for further processing, building, manufacturing, and/or the like. That is, any carbon that may remain in exhaust gas 118 after performing the combustion or reaction process in decarbonization component 102, and/or additional carbon that may be introduced into exhaust gas 118 by mixing auxiliary fuel 136 may be generated or extracted as additional carbon particles 146 by performing a second combustion or reaction process using auxiliary decarbonization component 144. Additionally, and similar to decarbonization component 102 shown and discussed herein with respect to FIG. 2, auxiliary decarbonization component 144 may also include a particle separation unit (not shown) configured to separate additional carbon particles 146 from remaining exhaust gas 148, as discussed herein.

Because additional carbon particles 146 are removed, generated, and/or collected from combusting mixture 140, remaining exhaust gas 148 generated by auxiliary decarbonization component 144 during the combustion process may be partially or completely free of carbon particles and/or carbon material. In non-limiting examples, remaining exhaust gas 148 may be formed as hydrogen gas, a mixture of hydrogen and nitrogen, or a mixture that is substantially comprised of hydrogen, nitrogen, and additional materials, including, but not limited to, a reduced amount (e.g., less than 5%) of carbon or additional carbon particles 146. Additionally, in a non-limiting example where both exhaust gas 118 and remaining exhaust gas 148 include a reduced amount of carbon, remaining exhaust gas 148 may include less carbon or fewer carbon particles than exhaust gas 118.

Additional carbon particles 146 generated by auxiliary decarbonization component 144 may be collected in an auxiliary carbon particle collection component 150. That is, and similar to carbon particle collection component 134, auxiliary carbon particle collection component 150 may be distinct from and in communication with auxiliary decarbonization component 144 to receive, collect, and/or store additional carbon particles 146 generated by auxiliary decarbonization component 144 during the combustion process. Auxiliary carbon particle collection component 144 may be formed from any suitable component, device, and/or system that may receive or pull additional carbon particles 146 from auxiliary decarbonization component 144, and store, collect, and/or receive, and subsequently preserve, additional carbon particles 146.

In another non-limiting example, and as shown in phantom in FIG. 5, additional carbon particles 146 may additionally or alternately be received, collected, and/or stored in carbon particle collection component 134, which may in communication with auxiliary decarbonization component 144. In this non-limiting example, carbon particle collection component 134 may be in communication with both decarbonization component 102 and auxiliary decarbonization component 144 for collecting carbon particles 112 and additional carbon particles 146, respectively.

Remaining exhaust gas 148 may flow or be provided to mixing duct 128. That is, a portion of exhaust conduit 126 fluidly coupling auxiliary decarbonization component 144 and mixing duct 128 may deliver remaining exhaust gas 148 to mixing duct 128. In the non-limiting example, mixing gas supply 108 may supply and/or provide additional auxiliary mixing gas 152 to mixing duct 128, while exhaust conduit 126 provides remaining exhaust gas 148 to mixing duct 128. Mixing duct 128 may receive remaining exhaust gas 148 and additional auxiliary mixing gas 152 and may subsequently mix the two gases to form mixture 154. As similarly discussed herein, mixing duct 128 may supply mixture 154 (e.g., remaining exhaust gas 148, additional auxiliary mixing gas 152) to gas turbine 10 and, more specifically, to premixer 25 in communication with combustor 24, so mixture 154 may be used to produce a working fluid (e.g., combustion gas flow 28) within gas turbine system 10. In the non-limiting example shown in FIG. 5, combustion gas flow 28 may include and/or be formed from the combustion of compressed air 22, fuel 26, and mixture 154 (e.g., remaining exhaust gas 148, additional auxiliary mixing gas 152).

Additionally, in the non-limiting example shown in FIG. 5, apparatus 100 may include a recirculation conduit 156 (shown in phantom as optional). Recirculation conduit 156 may be in fluid communication with, and/or may be fluidly coupled to, exhaust conduit 126. More specifically, recirculation conduit 156 may include a first end 158 and a second end 160, each fluidly coupled to and in fluid communication with exhaust conduit 126. In the non-limiting example, first end 158 of recirculation conduit 156 may be fluidly coupled to exhaust conduit 126 downstream of auxiliary decarbonization component 144 and upstream of mixing duct 128. Second end 160, positioned opposite first end 158, may be fluidly coupled to exhaust conduit 126 upstream of fuel valve 138 and auxiliary decarbonization component 144, respectively. Recirculation conduit 156 may allow apparatus 100 to reuse at least a portion of remaining exhaust gas 148 when generating additional carbon particles 146. That is, a portion of remaining exhaust gas 148 generated by auxiliary decarbonization component 144 may be recirculated back via recirculation conduit 156, upstream of fuel valve 138 and auxiliary decarbonization component 144. The portion of remaining exhaust gas 148 recirculated by recirculation conduit 156 may be mixed with exhaust gas 118 generated by decarbonization component 102, before the addition of auxiliary fuel 136, as discussed herein. Recirculating the portion of remaining exhaust gas 148 via recirculation conduit 156 may allow for any additional carbon (e.g., additional carbon particles 146) to be removed from the recirculated portion of remaining exhaust gas 148.

Figure 6:
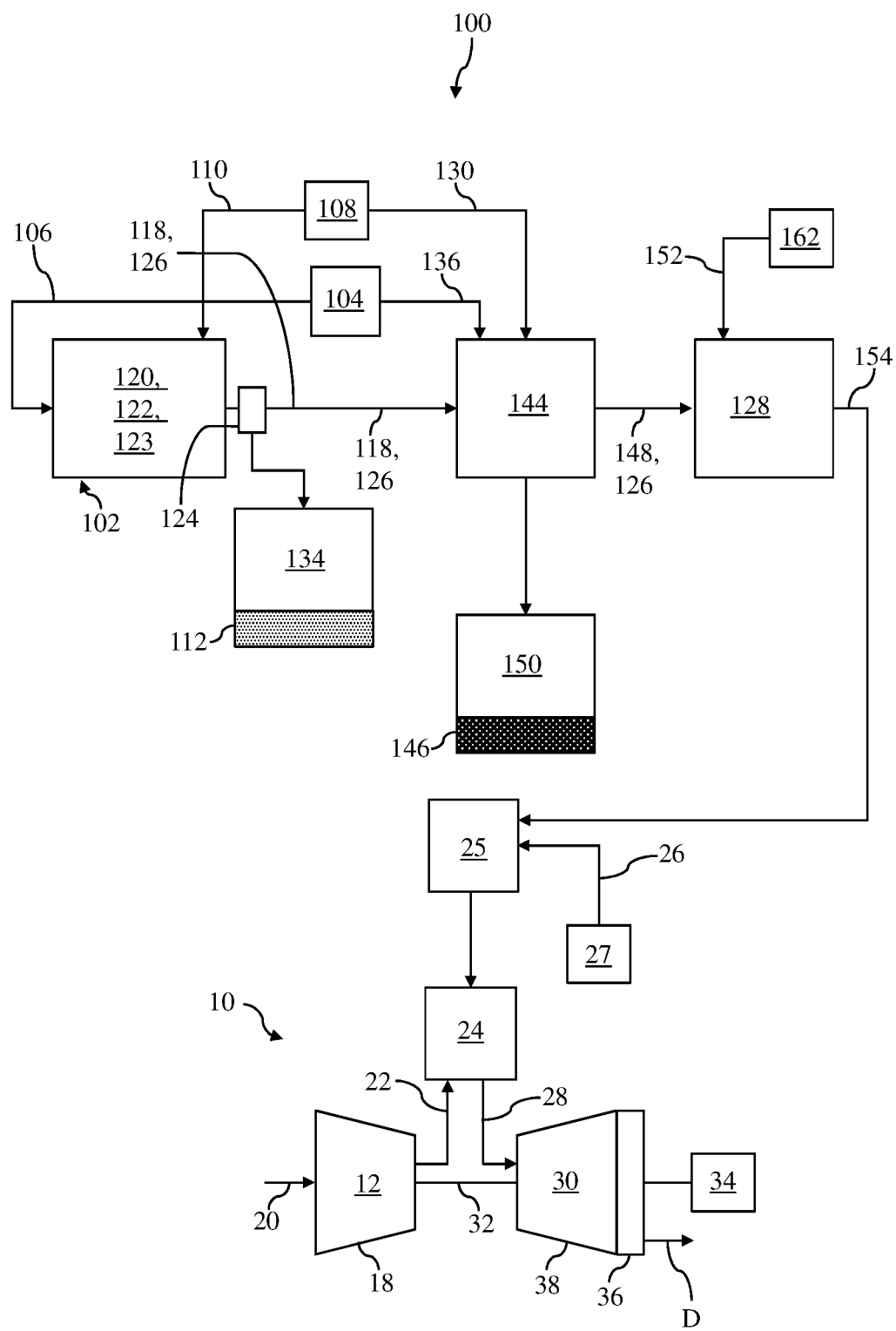
FIG. 6 shows a schematic diagram of a gas turbine system and an apparatus for generating carbon particles and exhaust gas, according to additional embodiments of the disclosure.

FIG. 6 shows another non-limiting example of apparatus 100. With comparison to FIG. 5, apparatus 100 may include auxiliary decarbonization component 144, but may not include fuel valve 138 positioned upstream of auxiliary decarbonization component 144. As a result, exhaust gas 118 generated by decarbonization component 102 may be provided directly to auxiliary decarbonization component 144 via exhaust conduit 126. In the non-limiting example, exhaust gas 118, auxiliary mixing gas 130, and auxiliary fuel 136 may be provided to, mixed, and subsequently combusted or reacted by auxiliary decarbonization component 144 to generate additional carbon particles 146 and remaining exhaust gas 148, respectively. That is, where apparatus 100 does not include fuel valve 138 in fluid communication with exhaust conduit 126, auxiliary fuel 136 may be provided directly to auxiliary decarbonization component 144 and may be mixed with exhaust gas 118 and auxiliary mixing gas 130 before the mixture is combusted and/or reacted.

Remaining exhaust gas 148 may be provided to mixing duct 128 via exhaust conduit 126, as similarly discussed herein. In the non-limiting example, an auxiliary mixing gas supply 162 may be in fluid communication with and/or fluidly coupled to mixing duct 128. As similarly discussed herein with respect to mixing gas supply 108 (see, FIG. 5), auxiliary mixing gas supply 162 may supply and/or provide additional auxiliary mixing gas 152 to mixing duct 128, while exhaust conduit 126 provides remaining exhaust gas 148 to mixing duct 128. Mixing duct 128 may receive remaining exhaust gas 148 and additional auxiliary mixing gas 152 and may subsequently mix the two fluid streams to form mixture 154. As similarly discussed herein with respect to FIG. 5, mixing duct 128 may supply mixture 154 (e.g., remaining exhaust gas 148, additional auxiliary mixing gas 152) to gas turbine 10 and, more specifically, to premixer 25 in communication with combustor 24, so mixture 154 may be used to produce a working fluid (e.g., combustion gas flow 28) within gas turbine system 10.

Figure 7:
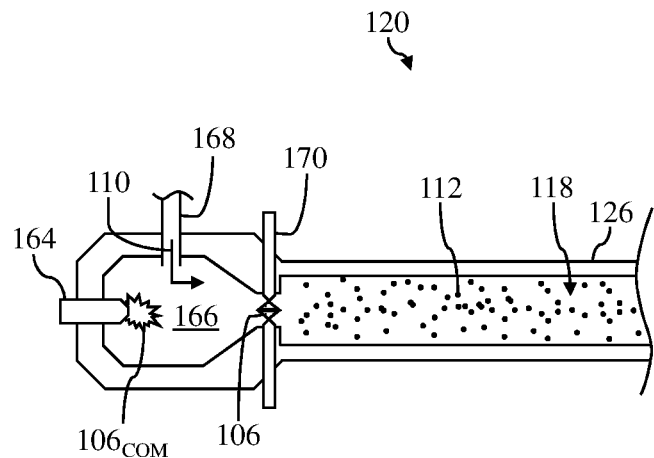
FIG. 7 shows a cross-sectional side view of a portion of a diffusion flame combustion component utilized in the apparatus of FIGS. 2-6, according to embodiments of the disclosure.
Figure 8:
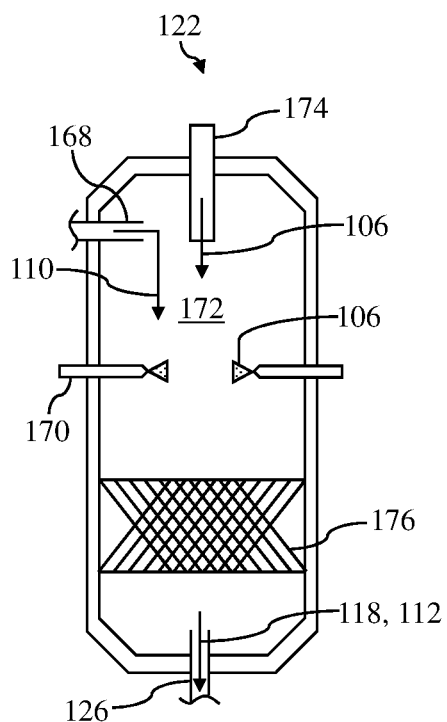
FIG. 8 shows a cross-sectional side view of a portion of a catalytic partial oxidation (CPOX) component utilized in the apparatus of FIGS. 2-6, according to embodiments of the disclosure.
Figure 9:
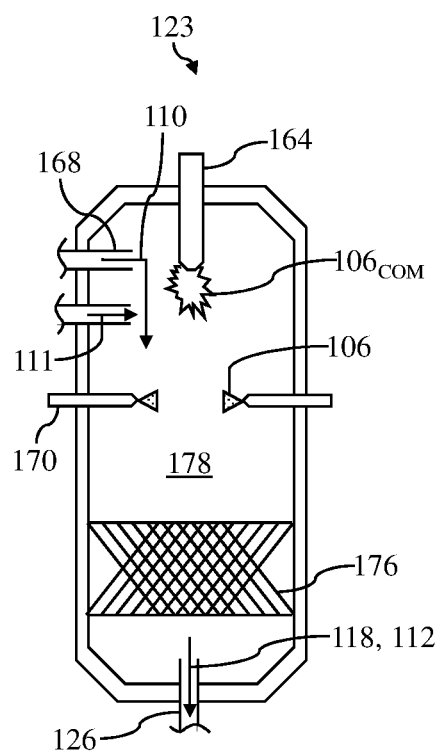
FIG. 9 shows a cross-sectional side view of a portion of an auto-thermal reformer component utilized in the apparatus of FIGS. 2-6, according to embodiments of the disclosure.

FIGS. 7-9 show side cross-section views of non-limiting examples of decarbonization component 102 of apparatus 100. More specifically, FIG. 7 shows a side cross-section view of diffusion flame combustion component 120, FIG. 8 shows a side cross-section view of CPOX component 122, and FIG. 9 shows a side cross-section view of auto-thermal reformer component 123. As discussed herein, each of these non-limiting examples of decarbonization component 102 may be implemented in apparatus 100 discussed herein with respect to FIGS. 2-6. It is understood that similarly numbered and/or named components may function in a substantially similar fashion. Redundant explanation of these components has been omitted for clarity.

In the non-limiting example shown in FIG. 7, decarbonization component 102 may be formed as diffusion flame combustion component 120. Diffusion flame combustion component 120 may be configured to combust fuel 106 and mixing gas 110 to generate carbon particles 112, as similarly discussed herein with respect to FIGS. 2-6. For example, a fuel 106 may be supplied to an ignitor 164 of diffusion flame combustion component 120 and subsequently ignited or combusted (e.g., $106_{COM}$) by ignitor. As discussed herein, fuel 106 may be supplied to ignitor 164 from fuel supply 104 of apparatus 100 (see, FIG. 2). Ignitor 164 may be configured as any suitable ignition or combustion device configured to combust fuel 106 within a combustion portion or chamber 166 (hereafter, "combustion chamber 166") of diffusion flame combustion component 120. For example, ignitor 164 may be configured as a device capable of producing a diffusion flame for combusting fuel 106 supplied thereto.

Diffusion flame combustion component 120 of FIG. 7 may also include mixing gas conduit 168 in fluid communication with combustion chamber 166. In the non-limiting example mixing gas conduit 168 may be in fluid communication with combustion chamber 166, downstream of ignitor 164. Mixing gas conduit 168 may be in fluid communication with mixing gas supply 108 of apparatus 100 (see, FIG. 2) for providing mixing gas 110 to diffusion flame combustion component 120. As discussed herein, mixing gas 110 provided to combustion chamber 166 may mix with combusted fuel $106_{COM}$ to aid in the generation of carbon particles 112 within diffusion flame combustion component 120.

As shown in FIG. 7, diffusion flame combustion component 120 may also include at least one fuel nozzle 170. In the non-limiting example, fuel nozzle(s) 170 may be positioned within diffusion flame combustion component 120 downstream of ignitor 164 and mixing gas conduit 168. Additionally, as shown in FIG. 7, fuel nozzle(s) 170 may be positioned downstream of combustion chamber 166 and/or between combustion chamber 166 and exhaust conduit 126 of apparatus 100 (see, FIG. 2). Fuel nozzle(s) 170 may be in fluid communication with fuel supply 104 for supplying additional fuel 106 to diffusion flame combustion component 120. More specifically, fuel nozzle(s) 170 may provide fuel 106 to diffusion flame combustion component 120 to be mixed with the combination or mixture of combusted fuel $106_{COM}$ delivered and combusted by ignitor 164 and mixing gas 110 provided by mixing gas conduit 168. The introduction of fuel 106 via fuel nozzle(s) 170 to the mixture of combusted fuel $106_{COM}$ and mixing gas 110, along with the heat generated by combusting fuel $106_{COM}$ within combustion chamber 166 may generate carbon particles 112 and exhaust gas 118. That is, combusting fuel $106_{COM}$, mixing fuel $106_{COM}$ with mixing gas 110, and the subsequent introduction of additional fuel 106 via fuel nozzle(s) 170 to the mixture of combusted fuel $106_{COM}$ and mixing gas 110 may result in the generation of carbon particles 112 within exhaust gas 118. As discussed herein, exhaust gas 118 may include the non-carbon or reduced-carbon mixture of combusted fuel $106_{COM}$, mixing gas 110, and fuel 106 introduced to diffusion flame combustion component 120 via fuel nozzle(s) 170. Carbon particles 112 and exhaust gas 118 shown in FIG. 7 may subsequently flow through exhaust conduit 126 and be further processed (e.g., by separating carbon particles 112 from exhaust gas 118 using particle separation unit 124), as similarly discussed herein with respect to FIGS. 2-6.

In the non-limiting example shown in FIG. 8, decarbonization component 102 may be formed as CPOX component 122. With comparison to FIG. 7, CPOX component 122 may include similar components, devices, and/or features as diffusion flame combustion component 120. Redundant explanation of these components has been omitted for clarity.

CPOX component 122 may be configured to react and/or perform a catalytic partial-oxidation process on fuel 106 and mixing gas 110 to generate carbon particles 112, as similarly discussed herein with respect to FIGS. 2-6. For example, fuel 106 may be supplied to reaction chamber 172 of CPOX component 122 via fuel conduit 174. Fuel conduit 174 may be in fluid communication with fuel supply 104 for supplying fuel 106 to reaction chamber 172. Mixing gas conduit 168 may also be in fluid communication with reaction chamber 172 and may provide mixing gas 110 to reaction chamber 172. Mixing gas 110 may be mixed with fuel 106 provided to reaction chamber 172 via fuel conduit 174, and flow through reaction chamber 172 of CPOX component 122. In the non-limiting example, reaction chamber 172 may be heated and/or provide radiant heat to fuel 106 and mixing gas 110 flowing therethrough to aid in the reaction and/or catalytic partial-oxidation process performed on fuel 106 and mixing gas 110 to generate carbon particles 112, as discussed herein.

As shown in FIG. 8, CPOX component 122 may also include at least one fuel nozzle 170. In the non-limiting example, fuel nozzle(s) 170 may be positioned within CPOX component 122 downstream of fuel conduit 174 and mixing gas conduit 168. Fuel nozzle(s) 170 may be in fluid communication with fuel supply 104 for supplying fuel 106 to reaction chamber 172 of CPOX component 122. That is, fuel nozzle(s) 170 may provide fuel 106 to CPOX component 122 to be mixed with the heated combination or mixture of fuel 106 provided by fuel conduit 174 and mixing gas 110 provided by mixing gas conduit 168. The introduction of fuel 106 via fuel nozzle(s) 170 to the heated mixture of fuel 106 and mixing gas 110, along with the heat generated by reaction chamber 172 may aid in the generation of carbon particles 112 and exhaust gas 118, as discussed herein.

CPOX component 122 may also include a catalyst component 176. Catalyst component 176 may be positioned within reaction chamber 172, downstream of mixing gas conduit 168, fuel conduit 174, and fuel nozzle(s) 170. Catalyst component 176 may be configured as any suitable system, component, and/or device that may interact with the heated mixture of fuel 106 and mixing gas 110 flowing through CPOX component 122 to create a catalytic reaction and/or response with the mixture. That is, as the mixture of fuel 106 from fuel conduit 174, mixing gas 110 from mixing gas conduit 168, and fuel 106 from fuel nozzle(s) 170, all of which are heated within reaction chamber 172, passes over and/or through catalyst component 176, catalyst component 176 may cause a catalytic reaction within the mixture to generate carbon particles 112 in exhaust gas 118. Carbon particles 112 and exhaust gas 118 shown in FIG. 8 may subsequently flow through exhaust conduit 126 and be further processed (e.g., by separating carbon particles 112 from exhaust gas 118 using particle separation unit 124), as similarly discussed herein with respect to FIGS. 2-6.

In the non-limiting example shown in FIG. 9, decarbonization component 102 may be formed as auto-thermal reformer component 123. With comparison to FIGS. 7 and 8, auto-thermal reformer component 123 may include similar components, devices, and/or features as diffusion flame combustion component 120 and CPOX component 122, respectively. Redundant explanation of these components has been omitted for clarity.

Auto-thermal reformer component 123 may be configured to both ignite or combust, as well as react and/or perform a catalytic process on fuel 106 and mixing gas 110 to generate carbon particles 112. For example, and similarly discussed herein with respect to FIG. 7, auto-thermal reformer component 123 may ignite or combust a fuel 106 supplied to ignitor 164 via fuel supply 104 of apparatus 100 (see, FIG. 2). Ignitor 164 may ignite or combust fuel $106_{COM}$ within chamber 178 of auto-thermal reformer component 123. Additionally, mixing gas conduit 168 may also be in fluid communication with chamber 178 of auto-thermal reformer component 123 and may provide mixing gas 110 thereto. Mixing gas 110 may be mixed with combusted fuel $106_{COM}$ provided to chamber 178 and flow through chamber 178 of auto-thermal reformer component 123. Additionally, and similarly to diffusion flame combustion component 120 of FIG. 7, fuel nozzle(s) 170 may be positioned downstream of ignitor 164 and mixing gas conduit 168 to introduce additional fuel 106 into chamber 178.

In the non-limiting example, chamber 178 and the mixture of fuel 106 and mixing gas 110 may be heated using the heat generated by the combustion of fuel $106_{COM}$ using ignitor 164. Additionally, or alternatively, the mixture of fuel $106_{COM}$, 106 and mixing gas 110 may be heated using heat (e.g., radiant heat) provided to and/or generated by chamber 178—similar to reaction chamber 172 of CPOX component 122 (see, FIG. 8). Furthermore, and distinct from the non-limiting examples discussed herein, the mixture of fuel $106_{COM}$, 106 and mixing gas 110 may be heated using steam 111 provided by and/or included within mixing gas 110. Steam 111 may be provided by an additional component or system, for example, a steam turbine system (not shown) in communication with gas turbine system 10 and apparatus 100 (see, FIG. 2), respectively. As similarly discussed herein with respect to CPOX component 122, heating the mixture of fuel $106_{COM}$, 106 and mixing gas 110 may aid in the reaction and/or catalytic process performed on fuel $106_{COM}$, 106 and mixing gas 110 to generate carbon particles 112, as discussed herein.

As shown in FIG. 9, and similarly to CPOX component 122 shown in FIG. 8, auto-thermal reformer component 123 may include catalyst component 176 positioned within chamber 178, downstream of mixing gas conduit 168, ignitor 164, and fuel nozzle(s) 170. Catalyst component 176 may be configured as any suitable system, component, and/or device that may interact with the heated mixture of fuel $106_{COM}$, 106 and mixing gas 110 flowing through auto-thermal reformer component to create a catalytic reaction and/or response with the mixture. The catalytic reaction and/or process performed on the heated mixture of fuel $106_{COM}$, 106 and mixing gas 110 by catalyst component 176 may in turn generate extractable carbon particles 112 and exhaust gas 118. Carbon particles 112 and exhaust gas 118, once generated using catalyst component 176, may subsequently flow through exhaust conduit 126 and be further processed (e.g., by separating carbon particles 112 from exhaust gas 118 using particle separation unit 124), as discussed herein.

Figure 1A:
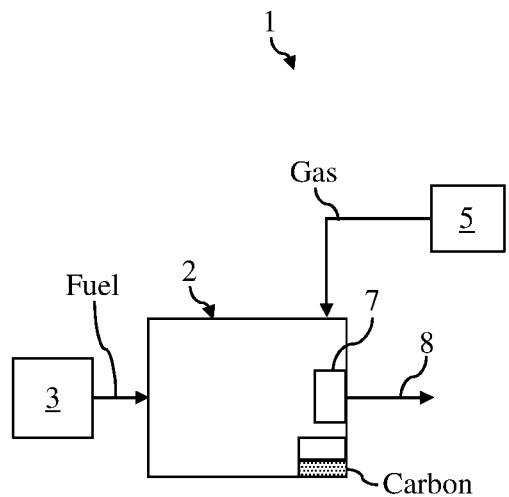
FIG. 1A shows a schematic diagram of a diffusion flame combustion component, according to conventional embodiments.
Figure 1B:
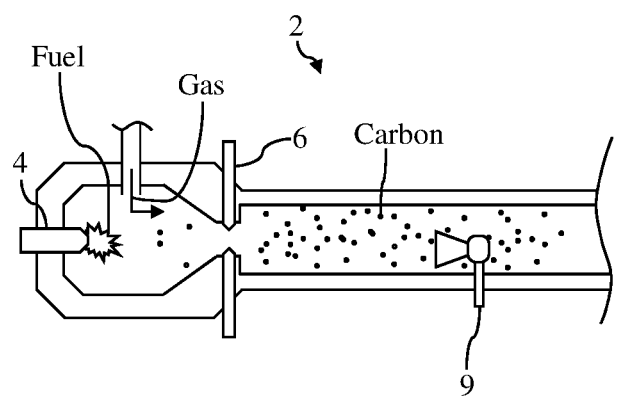
FIG. 1B shows a cross-sectional side view of a portion of the diffusion flame combustion component of FIG. 1A, according to conventional embodiments.

Each of the non-limiting examples of decarbonization component 102 shown in FIGS. 7-9 may exclude specific components and/or devices included in conventional diffusion flame system 1 shown in FIGS. 1A and 1B. For example, each of decarbonization component 102 shown in FIGS. 7-9 may not include quenching component 9 or any other similar device that may be utilized to separate carbon particles 112 from exhaust gas 118, as well as to reduce the temperature of exhaust gas 118 generated by decarbonization component 102. The non-limiting examples of decarbonization component 102 shown in FIGS. 7-9 may exclude such components or devices because maintaining a high temperature for exhaust gas 118 may improve and/or increase operational efficiency of gas turbine system 10 (see, FIG. 2). More specifically, the increased or heightened temperature of exhaust gas 118 may allow combustor 24 to combust the working fluid (including exhaust gas 118) provided therein more efficiently (e.g., decreased fuel requirement), and/or may increase the amount and/or force of combustion gas 28 generated by combustor 24 and provided to turbine 30, as discussed herein.

In other non-limiting examples (not shown), decarbonization component 102 may include a device configured to spray a liquid (e.g., water) therein (e.g., quenching device) to aid in the filtration of carbon particles 112 from exhaust gas 112. Additionally, in the non-limiting example where decarbonization component 102 includes the device (e.g., quenching device), the device may be configured to only spray liquid when it is determined that the temperature of exhaust gas 118 is above a desired temperature of exhaust gas 118 in order to increase and/or improve operational efficiency of gas turbine system 10, as discussed herein. As such, the device may aid in maintaining exhaust gas 118 at the desired temperature to increase and/or improve operational efficiencies of gas turbine system 10, as well as aid in filtration of carbon particles 112 from exhaust gas 118.

Figure 10:
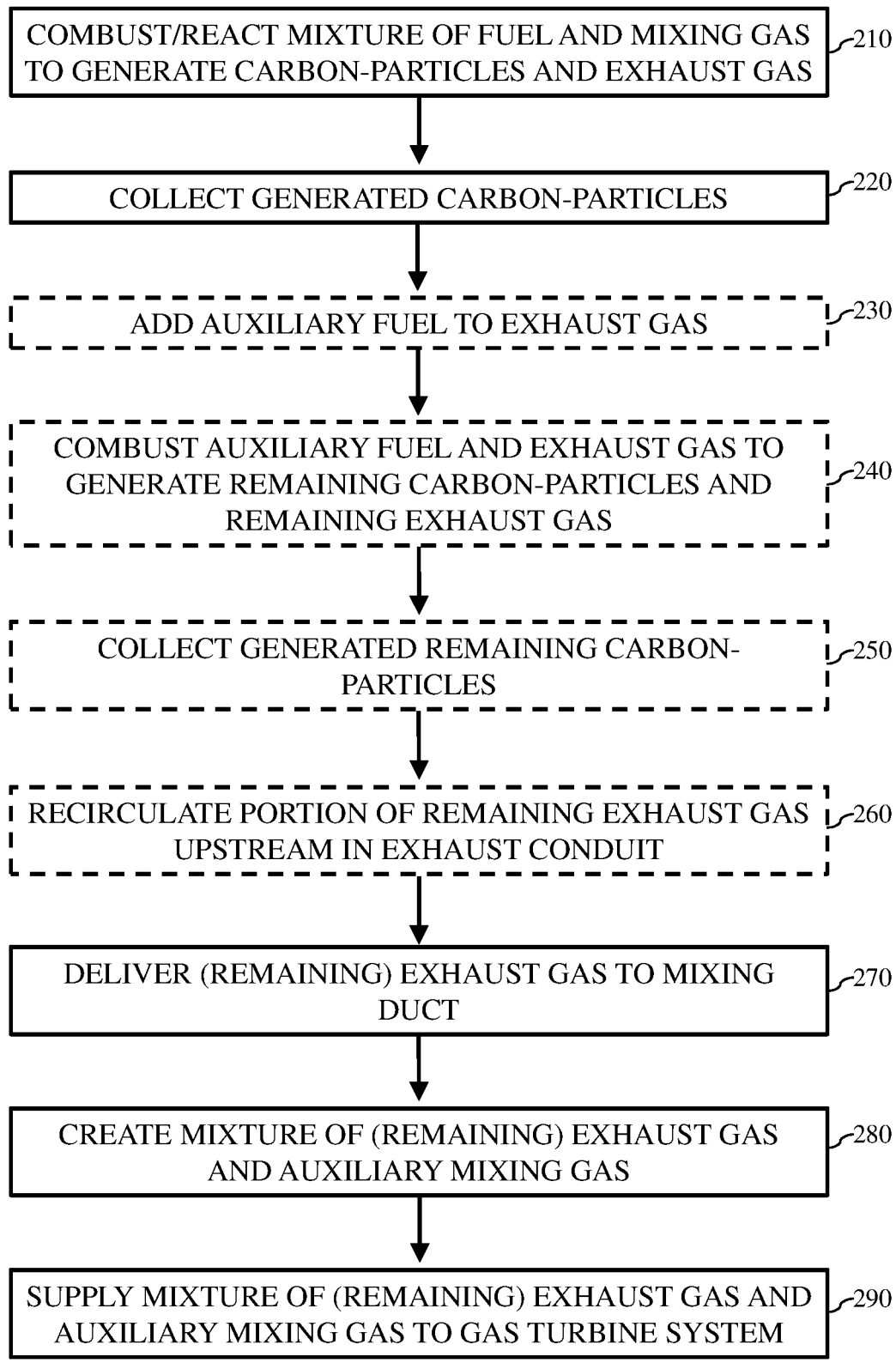
FIG. 10 shows a flow chart of example processes for generating carbon particles and exhaust gas to be used by a gas turbine system, according to embodiments of the disclosure.

FIG. 10 shows example processes of generating carbon particles and exhaust gas. More specifically, FIG. 10 shows a flow diagram illustrating non-limiting example processes of generating carbon particles and exhaust gas used by gas turbine systems. In some cases, the processes may be performed using one or more apparatus embodiments of the present disclosure, e.g., as discussed previously herein and/or shown in FIGS. 2-9.

In process 210, a mixture of fuel and mixing gas may be combusted or reacted. More specifically, a mixture of fuel and mixing gas may be provided to, mixed, and subsequently combusted or reacted by a decarbonization component. The decarbonization component may combust or react the mixture of fuel and mixing gas to generate carbon particles and exhaust gas. In a non-limiting example, combusting or reacting the mixture of fuel and mixing gas using the decarbonization component may further include exposing the mixture of fuel and mixing gas to a diffusion flame to generate carbon particles and exhaust gas. In another non-limiting example, combusting or reacting the mixture of fuel and mixing gas using the decarbonization component may further include performing a catalytic partial oxidation process to generate carbon particles and exhaust gas. In another non-limiting example, combusting or reacting the mixture of fuel and mixing gas using the decarbonization component may further include exposing the mixture of fuel and mixing gas to a fuel-rich oxidation process, such as within an auto-thermal reactor.

In process 220, the generated carbon particles may be collected. That is, the carbon particles generated in the combustion process of 210 may be collected and/or gathered from the decarbonization component. In a non-limiting example, the carbon particles may be collected in a storage portion of the decarbonization component. In another non-limiting example, the carbon particles may be collected in a carbon particle collection component in communication with the decarbonization component. Carbon particles may be collected and/or stored in the carbon particle collection components by separating the carbon particles from the exhaust gas using a particle separation unit. The particle separation unit may include, but is not limited to, filters, screens, or cyclonic separators to separate the carbon particles from the exhaust gas.

In process 230 (shown in phantom as optional), auxiliary fuel may be added to the exhaust gas. Specifically, auxiliary fuel may be added to the exhaust gas generated by the decarbonization component during the combustion/reaction process of 210. In a non-limiting example, the auxiliary fuel may be added to the exhaust gas flowing through an exhaust conduit that may be in fluid communication with the decarbonization component. A fuel valve may be positioned on and/or in communication with the exhaust conduit in order to deliver the auxiliary fuel in process 230. The auxiliary fuel may be added to the exhaust gas prior to the exhaust gas being delivered to a mixing duct (e.g., process 270) or an auxiliary decarbonization component (e.g., process 240). In process 230, auxiliary fuel may be added to the exhaust gas that is free or substantially free of carbon particles (e.g., carbon particles having been removed and collected in process 220).

In process 240 (shown in phantom as optional), a mixture of the auxiliary fuel, the exhaust gas, and/or auxiliary mixing gas may be combusted or otherwise reacted. More specifically, a mixture of the auxiliary fuel and the exhaust gas may be provided to, mixed, and subsequently combusted or reacted by an auxiliary decarbonization component positioned downstream of the decarbonization component utilized in process 210. In another non-limiting example, the auxiliary decarbonization component may also be provided auxiliary mixing gas and may combust or react a mixture of the auxiliary fuel, the exhaust gas, and auxiliary mixing gas. Similar to the decarbonization component in process 210, the auxiliary decarbonization component may combust or react the mixture of auxiliary fuel, exhaust gas, and/or auxiliary mixing gas to generate additional carbon particles and remaining exhaust gas. In a non-limiting example, the combustion process 240 may further include exposing the mixture of auxiliary fuel, exhaust gas, and/or auxiliary mixing gas to a diffusion flame, performing a catalytic partial oxidation process, or performing a fuel-rich, auto-thermal reaction to generate the additional carbon particles and the remaining exhaust gas. The auxiliary decarbonization component may be the same type of component as used in process 210, or it may be a different type of decarbonization component.

In process 250 (shown in phantom as optional), the generated, additional carbon particles may be collected. That is, the additional carbon particles generated in the combustion process of 240 may be collected and/or gathered from the auxiliary decarbonization component. In a non-limiting example, the additional carbon particles may be collected in a storage portion of the auxiliary decarbonization component. In another non-limiting example, the additional carbon particles may be collected in the carbon particle collection component (e.g., process 220) in communication with the auxiliary decarbonization component, as well as the decarbonization component of process 210. In other non-limiting examples, the additional carbon particles may be collected in an auxiliary carbon particle collection component in communication with the auxiliary decarbonization component. Additional carbon particles may be collected and/or stored after separating the additional carbon particles from the remaining exhaust gas using a particle separation unit. The particle separation unit may include, but is not limited to, filters, screens, or cyclonic separators to separate the additional carbon particles from the remaining exhaust gas.

In process 260 (shown in phantom as optional), a portion of the remaining exhaust gas may be recirculated within the apparatus. More specifically, a portion of the remaining exhaust gas generated by the auxiliary decarbonization component in process 240 may be recirculated back into the exhaust conduit, upstream of the auxiliary decarbonization component, but downstream of the decarbonization component (e.g., the decarbonization component used in process 210). The exhaust gas may be recirculated within the apparatus using a recirculation conduit having a first end in fluid communication with the exhaust conduit downstream of the auxiliary decarbonization component and having a second end upstream of the auxiliary decarbonization component. The second end of the recirculation conduit may be upstream or downstream of the fuel valve that delivers the auxiliary fuel to the exhaust gas generated in process 210.

In process 270, the exhaust gas generated in process 210 or, alternatively, the remaining exhaust gas generated in process 240 may be delivered to a mixing duct. That is, the exhaust conduit receiving the exhaust gas or the remaining exhaust gas may be in fluid communication with a mixing duct in order to deliver the (remaining) exhaust gas to the mixing duct. The mixing duct may also be in fluid communication with a mixing gas supply for receiving auxiliary mixing gas.

In process 280, a mixture of (remaining) exhaust gas and auxiliary mixing gas may be created. That is, the mixing duct of the apparatus may receive the (remaining) exhaust gas and the auxiliary mixing gas and may mix, combine, and/or create a mixture of the (remaining) exhaust gas and auxiliary mixing gas.

In process 290, the mixture of the (remaining) exhaust gas and auxiliary mixing gas may be supplied to a gas turbine system. More specifically, the mixing duct creating the mixture of the (remaining) exhaust gas and auxiliary mixing gas may be in fluid communication with the gas turbine system and may supply the mixture of the (remaining) exhaust gas and auxiliary mixing gas to a premixer in fluid communication with a combustor of the gas turbine system. The supplying of the mixture of the (remaining) exhaust gas and auxiliary mixing gas may include combining the mixture of (remaining) exhaust gas and auxiliary mixing gas with a working fluid of the gas turbine system. For example, the mixture of the (remaining) exhaust gas and auxiliary mixing gas may be combined and/or mixed with a fuel in the premixer. The mixture of the (remaining) exhaust gas, auxiliary mixing gas, and fuel may then be provided from the premixer to the combustor to be mixed with compressed air generated by the compressor of the gas turbine system. The mixture of the (remaining) exhaust gas, auxiliary mixing gas, fuel, and compressed air may be combined and subsequently ignited in the combustor to form the working fluid in the combustor of the gas turbine system. In this non-limiting example, the combustion gas flow created by the combustor of the gas turbine system may be formed from the compressed air of the compressor, as well as the mixture of the (remaining) exhaust gas, auxiliary mixing gas, and the fuel provide to the premixer by a fuel supply. In at least one embodiment, the working fluid drives the turbine, which is coupled to a generator to produce electrical power.

Although shown and discussed herein as being performed in sequential order (e.g., 210-290), it is understood that the process of generating carbon particles and exhaust gas for a gas turbine system may be performed using only a portion of the processes discussed herein. For example, carbon particles and exhaust gas may be generated by performing processes 210, 220, 270, 280, and 290. Additionally, not all of the optional processes need to be performed in order to generate carbon particles and exhaust gas, as discussed herein. For example, carbon particles and exhaust gas may be generated by performing processes 210, 220, 230, 270, 280, and 290.

Technical effects of the disclosure include providing an apparatus and process for generating carbon particles that may be utilized in post processing and/or manufacturing, as well as generating exhaust gas that may be used as a working fluid within a turbine system for power generation. By the processes described herein, significant value is obtained from the exhaust gas of the carbon particle generation process by employing such exhaust gas to produce a working fluid within a gas turbine to generate electrical power, rather than merely expelling the exhaust gas as an unwanted by-product of the decarbonization process.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. An apparatus for generating carbon particles and an exhaust gas used by a gas turbine system, the apparatus comprising:
    a decarbonization component combusting or reacting a mixture of a fuel and a mixing gas to generate the carbon particles and the exhaust gas,
    a carbon particle collection component in communication with the decarbonization component, wherein the generated carbon particles are collected in the carbon particle collection component;
    an exhaust conduit in fluid communication with the decarbonization component, the exhaust conduit receiving the exhaust gas generated by the decarbonization component; and
    a mixing duct in fluid communication with the exhaust conduit and the gas turbine system, the mixing duct receiving the exhaust gas and providing the exhaust gas to the gas turbine system to be used to produce a working fluid within the gas turbine system.

2. The apparatus of claim 1, wherein the decarbonization component includes at least one of:
    a diffusion flame combustion component,
    a catalytic partial oxidation (CPOX) component, or
    an auto-thermal reformer component.

3. The apparatus of claim 1, further comprising a mixing gas supply in fluid communication with the decarbonization component, the mixing gas supply providing the mixing gas to the decarbonization component.

4. The apparatus of claim 3, wherein the mixing gas supply is in fluid communication with the mixing duct, the mixing gas supply providing the mixing gas to the mixing duct to be mixed with the exhaust gas prior to providing the exhaust gas and the mixing gas to the gas turbine system.

5. The apparatus of claim 4, wherein the mixing duct provides a mixture of the exhaust gas and the mixing gas to a premixer in communication with a combustor of the gas turbine system.

6. The apparatus of claim 1, further comprising:
    a fuel supply in fluid communication with the exhaust conduit, the fuel supply providing an auxiliary fuel to the exhaust conduit to be mixed with the exhaust gas.

7. The apparatus of claim 6, further comprising:
    an auxiliary decarbonization component in fluid communication with the exhaust conduit and the mixing duct, and positioned upstream of the mixing duct, the auxiliary decarbonization component combusting the exhaust gas and the auxiliary fuel provided by the fuel supply to generate additional carbon particles and a remaining exhaust gas.

8. The apparatus of claim 7, further comprising:
    a carbon particle collection component in communication with at least one of:
    the decarbonization component for collecting the carbon particles generated by the decarbonization component, or
    the auxiliary decarbonization component for collecting the additional carbon particles generated by the auxiliary decarbonization component.

9. The apparatus of claim 7, further comprising:
    an auxiliary carbon particle collection component in communication with the auxiliary decarbonization component, the auxiliary carbon particle collection component collecting the additional carbon particles generated by the auxiliary decarbonization component.

10. The apparatus of claim 7, further comprising:
    a recirculation conduit in fluid communication with the exhaust conduit, the recirculation conduit including:
        a first end fluidly coupled to the exhaust conduit, downstream of the auxiliary decarbonization component; and
        a second end fluidly coupled to the exhaust conduit, upstream of the auxiliary decarbonization component.

11. A method comprising:
    combusting or reacting a mixture of a fuel and a mixing gas using a decarbonization component to generate carbon particles and an exhaust gas;
    collecting the generated carbon particles;
    delivering the exhaust gas from the decarbonization component to a mixing duct in fluid communication with the decarbonization component; and
    supplying the exhaust gas, via the mixing duct, to a gas turbine system in fluid communication with the mixing duct,
    wherein the collecting the generated carbon particles includes collecting the generated carbon particles in a carbon particle collection component in communication with the decarbonization component.

12. The method of claim 11, further comprising supplying an auxiliary mixing gas to the mixing duct to create a mixture of the exhaust gas and the auxiliary mixing gas; and
    supplying the mixture of the exhaust gas and the auxiliary mixing gas to the gas turbine system.

13. The method of claim 12, wherein supplying the mixture of the exhaust gas and the auxiliary gas to the gas turbine system further includes:
    combining the mixture of the exhaust gas and the auxiliary mixing gas with a compressed air flow in the gas turbine system.

14. The method of claim 11, further comprising:
adding auxiliary fuel to the exhaust gas delivered to the mixing duct;
combusting or reacting the auxiliary fuel and the exhaust gas in an auxiliary decarbonization component to generate additional carbon particles and a remaining exhaust gas; and
delivering the remaining exhaust gas from the auxiliary decarbonization component to the mixing duct.

15. The method of claim 14, further comprising:
collecting the additional carbon particles in one of:
- a carbon particle collection component in communication with the decarbonization component and the auxiliary decarbonization component, or
- an auxiliary carbon particle collection component in communication with the auxiliary decarbonization component.

16. The method of claim 14, further comprising:
recirculating a portion of the remaining exhaust gas into the exhaust conduit, upstream of the auxiliary decarbonization component.

17. The method of claim 11, wherein combusting or reacting the mixture of the fuel and the mixing gas using the decarbonization component further includes at least one of:
exposing the mixture of the fuel and the mixing gas to a diffusion flame, or
performing a catalytic partial oxidation process, or
subjecting the mixture of the fuel and the mixing gas to a fuel-rich oxidation process.

18. A system comprising:
a gas turbine system including:
  a rotor;
  a compressor coupled to the rotor, the compressor generating compressed air;
  a combustor in fluid communication with the compressor, the combustor generating combustion gas flow using the compressed air; and
  a turbine component in fluid communication with the combustor for receiving the combustion gas flow; and
an apparatus for generating carbon particles and an exhaust gas used by the gas turbine system, the apparatus in fluid communication with the gas turbine system and including:
  a decarbonization component the decarbonization unit including a catalytic partial oxidation (CPOX) component, the CPOX combusting or reacting a mixture of a fuel and a mixing gas to generate the carbon particles and the exhaust gas;
  a carbon particle collection component in communication with the decarbonization component, wherein the generated carbon particles are collected in the carbon particle collection component;
  an exhaust conduit in fluid communication with the CPOX component, the exhaust conduit receiving the exhaust gas generated by the CPOX component; and
  a mixing duct in fluid communication with the exhaust conduit and the gas turbine system, the mixing duct receiving the exhaust gas and providing the exhaust gas to the combustor to produce the combustion gas flow directed to the turbine component.

* * * * *